United States Patent Office 3,392,401
Patented July 9, 1968

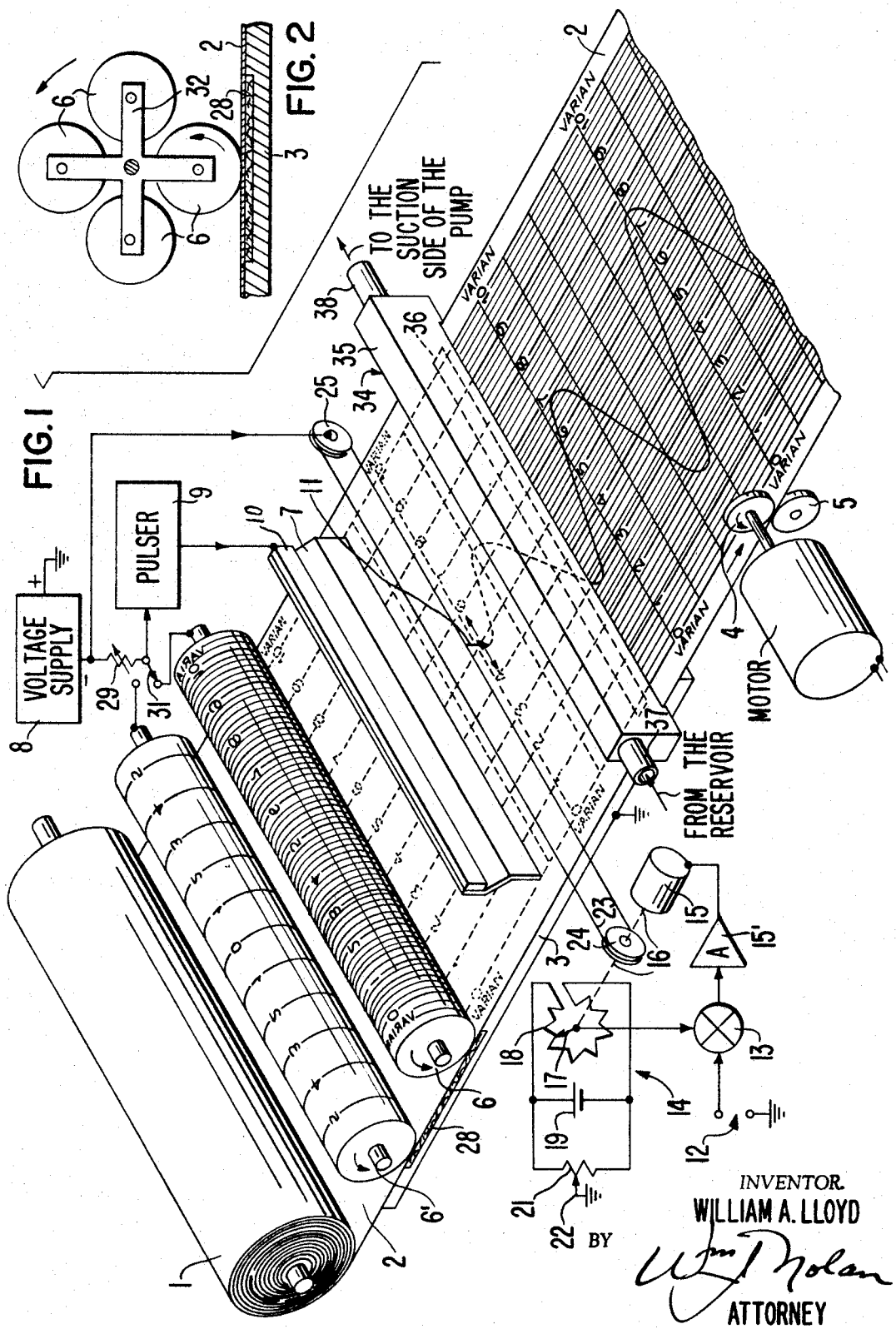

3,392,401
GRAPHIC RECORDER EMPLOYING INTEGRAL ELECTROGRAPHIC CHART PRINTING MEANS
William A. Lloyd, San Jose, Calif., assignor to Varian Associates, Palo Alto, Calif., a corporation of California
Filed Sept. 12, 1966, Ser. No. 578,801
6 Claims. (Cl. 346—23)

ABSTRACT OF THE DISCLOSURE

An electrographic recorder is disclosed. The electrographic recorder includes an electrographic chart printing electrode structure for laying down an electric charge image grid pattern corresponding to the ordinate and abscissa indica upon the electrographic recording paper. The chart printing electrode structure includes a roller electrode for laying down a series of longitudinal lines corresponding to the ordinate indicia and a transversely oriented electrode structure supplied with timed writing pulses from a pulse generator to lay down the abscissa grid lines. An array of writing electrodes are selectively energized for laying down a charge image pattern corresponding to the signal to be recorded. A developer is provided for applying electrographic toner particles to the charge image patterns for developing the signal to be recorded and the grid lines of the chart. In one embodiment of the present invention, a plurality of different rollers are provided which may be selectively operated for changing the ordinate grid scale as desired. In addition, the timing of the pulses of writing potential applied to the abscissa grid line electrode may be selectively changed for changing the abscissa scale. In another embodiment of the present invention, means are provided for reducing the writing potential applied to the chart printing electrode structure for reducing the intensity of the chart scale lines relative to the signal line being recorded on the recording paper.

Heretofore, graphic recorders have typically utilized paper pre-printed with both an amplitude and time scale in the form of a grid pattern. This paper is drawn past the writing stylus, typically an ink fed pen, which moves laterally of the paper in response to the input signal to record the signal. In such recorders, the chart paper typically includes a row of holes along each side margin of the paper for mating with the teeth of a drive sprocket wheel. The sprocket wheel is driven at certain predetermined speeds for pulling the chart paper at only certain predetermined speeds, such as for example 1"/sec., 5"/sec., 20"/sec., . . . etc. The chart paper is pre-printed with a certain number of time scale divisions per inch. Thus, by knowing the chart paper speed the time interval between recorded events can be ascertained. However, the accuracy of the speed of the paper pulling mechanism sets the limit of accuracy in the time scale of the recorded information. Thus, an accurate recorder of this type requires an elaborate paper pulling mechanism and places limits upon practical paper pulling speeds.

In addition, with this type of recorder the writing stylus must be accurately aligned with the pre-printed amplitude scale marks on the paper. Thus, the paper must be accurately guided in the lateral direction or errors are introduced in the recorded amplitude of the signal. This further complicates the paper pulling mechanism.

Attempts have been made to eliminate the severe restrictions on the speed of the pre-printed chart paper by use of a second pen which lays down timing marks on the margin of the preprinted chart paper. These timing marks permit calibration of the printed time scale but make interpretation of the recorded signal tedious and time consuming.

Other recorders such as light beam writing recorders, which write on photosensitive paper, employ timing marks introduced by the light beam plus separate light means for writing amplitude scale divisions on the paper. However, these timing marks are more difficult to interpret than timing scale divisions of a printed grid pattern and photosensitive paper is relatively expensive.

One prior art electrographic recorder employing a lateral array of fixed writing electrodes has used the array or a separate lateral electrode to lay down time scale indices, but not amplitude scale indices. Such a recorder is described in U.S. Patent 2,501,791, issued Mar. 28, 1950.

In the present invention, a supply of unprinted electrographic chart paper is employed and the recorder includes electrode means for printing amplitude and time scale grid patterns on the paper as it is pulled through the recorder. In this manner, the paper may be pulled through the recorder at any arbitrary speed commensurate with the desired spatial separation between recorded events, thereby greatly simplifying the paper pulling apparatus. In addition, the lateral accuracy of the paper pulling and guiding apparatus can be relaxed since the writing electrode need only be aligned with the amplitude scale printing electrode means and is, thus, independent of lateral motion of the chart paper.

In a preferred embodiment of the present invention, the electrographic paper is printed with electrostatic images by a first integral electrode means to form amplitude scale and alphanumeric indices and by a second electrode means which lays down electrostatic images forming the timing scale grid indices. In addition, the recorder writing electrode records the signal trace as an electrostatic image. The images are then developed by an electrographic inker preferably of the liquid type which applies finely divided pigment particles to the charge images on the dielectric surface of the electrographic paper to form a visible permanent recording.

The principal object of the present invention is the provision of an improved graphic recorder having integral means for printing amplitude and time scale indices.

One feature of the present invention is the provision of a graphic recorder having integral means for electrographically printing amplitude and/or time scale indices, whereby the paper pulling mechanism for the recorder may be simplified and interpretation of the recorded signal trace facilitated.

Another feature of the present invention is the same as the preceding feature wherein the amplitude scale indices are printed by a roller electrode having the ampltiude scale embossed thereon.

Another feature of the present invention is the same as any one or more of the preceding features wherein the time scale indices are printed by an electrode extending laterally of the electrographic recording web and energized by timing pulses applied thereto.

Another feature of the present invention is the same as any one or more of the preceding features wherein the amplitude scale printing means includes plural embossed rollers which are selectively mechanically or electrically actuated for changing amplitude scale indices for the recorder.

Another feature of the present invention is the same as any one or more of the preceding features wherein the signal to be recorded is deposited on electrographic chart paper as an electrostatic image which is developed, along with the amplitude and timing scale indices, by means for applying a liquid electrographic toner to the images.

Another feature of the present invention is the same as any one or more of the preceding features including means for attenuating the writing potential applied to the chart scale writing electrodes relative to the signal writing electrode to suppress the intensity of the chart scale indices relative to the intensity of the recorded signal trace thereby facilitating interpretation of the recorded signal.

Other features and advantages of the present invention will become apparent upon a perusal of the following specification taken in connection with the accompanying drawings wherein:

FIG. 1 is a schematic perspective view of a graphic recorder of the present invention, and FIG. 2 is a transverse view of an alternative embodiment of the structure of FIG. 1.

Referring now to FIG. 1 there is shown the graphic recorder of the present invention. A supply roll 1 of unprinted electrographic recording web 2, such as, for example, electrographic paper marketed by Crown Zellerbach, Inc. or Plastic Coating Corp., or electrosensitive paper, supplies the recording web 2 for the recorder. The recording web 2 is drawn from the supply roll 1 over a conductive base plate electrode 3 by a motor driven friction wheel 4, frictionally engaging the web 2 between the friction wheel 4 and an idler wheel 5. The motor which drives the friction wheel 4 is adjustable in speed to provide a variable pulling speed on the recording web 2. The speed of the web 2 is adjusted as desired to provide sufficient spacing between the events being recorded. Suitable speeds vary from 1 inch per hour to 40 inches per second depending on the information rate to be recorded.

The recorder chart scale indices are electrographically written on the web 2, preferably by means of two separate electrodes. An embossed conductive roller 6 forms the means for writing the amplitude scale indices of the recorder chart. The amplitude scale roller 6, as of a 1" diameter brass cylinder, is embossed as by photoengraving on its surface with a series of axially spaced circumferentially directed ridges, as of 0.003" in height. In addition, numerals are embossed on certain of the ridges to identify the major subdivisions of the scale. Also, other lettering may be embossed on the roller 6 to identify the recorder manufacturer, user, or the like. The time scale indices of the recorder chart are electrographically written on the web 2 by means of a thin electrode 7 as of 0.005" thick beryllium copper sheet spring stock material laterally directed of the web 2. In a preferred embodiment, the thin side edge of the electrode 7 is disposed adjacent the writing surface of the web 2 and is bent and supported from rigidly fixed bar 10 such as to exert a small spring bias force against the writing surface of the web 2.

Electrographic writing potentials are supplied to the scale writing electrodes 6 and 7 relative to the grounded base plate 3 by a voltage supply 8. In the case of electrostatic writing on electrographic paper 2, the voltage of supply 8 falls within the range of −300 to −1000 volts. A pulser 9 serves to pulse the writing potential applied to the time scale electrode 7 from the supply 8 with a train of pulses. The writing pulses of the pulse train are typically between 100μ seconds and 1 millisecond long and are time spaced at any desired predetermined interval depending upon the rate information is being recorded. Typical time spacings fall within the range of 0.02 second to 1 hour, thereby providing a full range of desired time scale indices.

A signal writing device 11 which may take any one of a number of different forms such as, for example, an ink fed pen, a stylus electrode, or an electrode array, writes the signal to be recorded on the web 2. In a preferred embodiment, the writing device 11 is a stylus electrode 11 movable laterally of the web 2 in response to an input signal to be recorded and as applied to a pair of input terminals 12 of the recorder. The input signal is fed from the terminals 12 to one input of an error detector circuit 13 wherein it is compared with a reference signal derived from a potentiometer network 14 to produce an error signal output. The error signal output is fed to an amplifier 15' and thence to a reversible motor 15 for causing the output shaft 16 of the motor to turn in a direction in accordance with the sense (phase) of the error signal.

The output shaft 16 is connected to a pickoff 17 of a potentiometer 18 in the potentiometer circuit 14 to cause the pickoff 17 to move around the potentiomeer and pick off a reference potential which is the reference input to the error detector 13. The motor will stop turning when the reference signal voltage balances out the input signal to be recorded. Thus, rotation of the output shaft 16 tracks the input signal.

The potentiometer network 14 includes a voltage source 19 and a second potentiometer 21. The second potentiometer 21 has a pickoff 22 which is grounded to the same point as the grounded one of the input terminals 12 to provide a zero reference voltage for the recorder.

The stylus electrode 11 is mounted on a closed loop cable drive 23 which passes over a pair of pulleys at opposite ends of the loops. One of the pulleys 24 is a drive pulley and is connected to rotate with the output shaft 16 of the motor 15. The other pulley 25 is an idler pulley. Rotation of shaft 16 in response to a change in the input signal causes the drive pulley 24 to be actuated to pull the stylus 11 back and forth over the web 2 in the lateral direction.

The writing potential is applied to the stylus 11 from the voltage supply 8 via conductive idler pulley 25 and conductive cable 23. In the case of electrostatic writing, the stylus electrode 11 combines with the base plate electrode 3 to produce an electric field which passes from the stylus 11 through the dielectric coating on the electrographic paper to the conductive paper backing portion of the paper which is in contact with the base plate 3. The stylus electrode 11 rides either in contact with the dielectric surface or a few ten thousandths of an inch above the dielectric surface and deposits a line of negative charge on the surface of the web 2 to form an invisible charge image trace of the input signal. Likewise, the timing scale writing electrode 7 produces a series of invisible laterally directed timing scale traces. Also, the amplitude scale roller electrode 6 produces a series of laterally spaced longitudinally directed invisible scale traces.

A felt pad 28 as of 1/16" thick is disposed between the web 2 and the base plate electrode 3 in the region of the roller electrode 6 to provide a resilient mat for the roller 6 to press against, thereby assuring even contact between the web and the embossed surface of the roller 6. The felt mat 28 also provides means for suppressing the intensity of the amplitude scale lines since some of the applied writing potential is dissipated in the resistance of the conductive paper backing portion of the web 2 between the roller 6 and the nearest point of contact between the paper 2 and the base plate 3. Alternatively or in addition, a variable resistor 29 is placed in circuit between the writing potential source 8 and the scale writing electrodes 6 and 7 for reducing the effective scale writing potential to subdue the intensity of the chart scale indices relative to the signal trace.

Different amplitude scale indices are provided by employing a second roller electrode 6' substantially identical to the roller 6 previously described but having a second scale embossed thereon. This second scale may be written onto the web 2 by actuating a switch 31 which disconnects the writing potential from the first roller electrode 6 and connects this potential to the second roller electrode 6'.

Referring now to FIG. 2 there is shown an alternative apparatus for providing plural amplitude scale writing roller electrodes 6. In this case, four rollers 6, each having a different amplitude scale embossed thereon, are carried from the arms of a spider 32. The spider is mechanically rotated 90° to change scales by bringing another one of the rollers 6 into engagement with the web 2.

As an alternative to amplitude scale writing roller electrodes 6, the amplitude scale could be written by a lateral array of styli, not shown, which would ride on the surface of the web at predetermined lateral intervals. However, writing the scale index numbers would add complexity to such a system.

In a preferred embodiment, the chart scale indices writing electrodes 6 and 7 are positioned as near to the signal writing device 11 as possible such that the recording web does not change lateral position after receiving the amplitude scale image and before receiving the signal image.

In the case of electrostatic writing, the invisible signal and chart scale images are developed by a developer 34. The developer may take various forms for applying finely divided pigment particles, in a dielectric fluid suspension of liquid or air, to the charge image. The charge image attracts the pigment out of the suspension. The pigment is then electrostatically bound to the image rendering same visible. In case the fluid is air, the particles are typically fixed to the image by heating. In case the fluid is a liquid, the particles are fixed to the image by drying the web 2.

A preferred developer device 34 comprises a hollow channel member 35 having an inking slot 36 laterally extending of the web 2. A pair of tubes 37 and 38 connect the channel 35 to an ink reservoir, not shown, and to the suction side of a liquid pump, not shown, respectively. The suction of the pump reduces the liquid pressure inside the channel 35 causing the image side of the web 2 to be drawn up against the marginal edges of the slot 36, thereby sealing the slot 36 and bringing the moving web 2 into contact with the ink (developer) inside the channel 35. The output of the pump can be returned to the reservoir. A suitable liquid developer (ink) is a 2 to 4% mixture of liquid toner concentrate in Shell Chemical Company's number 72 solvent. The toner concentrate is marketed by Philip A. Hunt Co. and by Plastic Coating Co.

In the case that an electrosensitive web 2 is used, the separate developing function, performed by the developer 34, is not necessary. In such case, the voltage supply 8 supplies substantial current to the writing electrodes 6, 7 and 11. The current flowing through the electrosensitive paper from the electrodes 6, 7 and 11 causes, in one kind of paper, a burning through of an opaque coating to expose a contrasting conductive laminate portion of the web 2, thereby producing a visible trace. In another kind of electrosensitive paper, the current produces an electrolysis action to discolor the paper and produce a visible trace. However, such electrosensitive papers are relatively expensive compared to the dielectric coated conductive paper used for electrostatic writing.

In an alternative embodiment of the amplitude scale writing electrode 6, the embossed conductive pattern is filled in by a dielectric coating and turned down to expose the conductive ridge portions, whereby the surface of the roller 6 is smooth. This avoids inadvertent contact between the recessed portions of the embossed pattern and the electrographic paper.

What is claimed is:

1. In a graphic recorder apparatus, means forming an input terminal to which is applied a signal to be recorded, means responsive to the input signal for writing a signal trace representative of the input signal on a movable electrographic recording web, means integral of the recording apparatus and forming an electrode structure for electrographically writing chart scale indices on the recording web, means for passing the recording web adjacent said chart scale writing electrode structure and said signal recording means, whereby the recorder records both the chart scale indices and the signal trace on the common recording web, said chart scale writing electrode structure including an amplitude scale electrode structure for electrographically writing a series of longitudinally directed amplitude scale indices on the recording web, the improvement wherein said amplitude chart scale writing electrode structure includes a roller electrode laterally extending of and engaging the recording web, said roller having a conductive pattern formed on the surface thereof corresponding to the amplitude scale to be written on the recording web, whereby said roller rolls with the movement of the web to electrographically write the amplitude scale indices on the web.

2. The apparatus of claim 1 wherein said electrode means for electrographically writing chart scale indices on the recording web includes means for electrographically writing a grid pattern of mutually orthogonal amplitude and time scale indices on the recording web as the web is moved past said chart scale writing electrode means.

3. The apparatus of claim 2 including means forming a supply roll of recording web, means forming a friction drive wheel engaging said recording web for pulling said web from said supply roll past said signal writing and said chart indices writing means, said recording web including a dielectric surface, said signal writing means being an electrode means, said signal writing and said chart writing electrode means each depositing an electrostatic line charge image on said dielectric surface of said recording web, and means for applying pigment particles suspended in a fluid dielectric vehicle to the deposited electrostatic images such that the pigment particles are pulled out of the fluid vehicle and bound to the image areas of the recording web for developing visible images thereof.

4. The apparatus of claim 2, including means for applying writing electrical potentials to said chart writing electrode means and said signal writing electrode means, and including means for applying a lesser effective electrical writing potential to said chart writing electrode means relative to said signal writing electrode means for suppressing the intensity of the recorded chart indices image relative to the recorded signal image, whereby visual interpretation of the recorded signal is facilitated.

5. The apparatus of claim 1, wherein said said amplitude scale writing electrode means includes means for mounting a plurality of rollers having different amplitude scale conductive patterns formed on the surface thereof over the surface of the recording web, and means for selectively operating different ones of said rollers to write different ones of the selective amplitude scales on the recording web as desired, whereby amplitude scales of the recorder may be changed while using a common recording web.

6. The apparatus of claim 1, further comprising time scale writing electrode means including a sheet metal member having a narrow side edge laterally extending of and writing on the surface of the movable recording web, means forming a pulse generator for generating a train of pulses having a predetermined time interval, and means for applying a train of pulses to said time scale electrode means for electrographically writing the series of time scale indices on the surface of the recording web.

References Cited

UNITED STATES PATENTS

| | | | |
|---|---|---|---|
| 1,827,178 | 10/1931 | Tonietti | 346—23 |
| 2,739,865 | 3/1956 | Willey | 346—33 |
| 3,233,244 | 2/1966 | Winterhalter | 346—23 |

FOREIGN PATENTS

| | | |
|---|---|---|
| 740,737 | 5/1943 | Germany. |
| 689,998 | 7/1964 | Canada. |

RICHARD B. WILKINSON, *Primary Examiner.*

STEPHEN J. TOMSKY, *Examiner.*

E. C. SIMMONS, *Assistant Examiner.*